Oct. 1, 1968 M. BELTOISE Re. 26,469

SELF-LOCKING NUT

Original Filed Jan. 2, 1964

INVENTOR
MAURICE BELTOISE
BY
Bacon & Thomas
ATTORNEYS

United States Patent Office

Re. 26,469
Reissued Oct. 1, 1968

26,469
SELF-LOCKING NUT

Maurice Beltoise, Paris, France, assignor to Beltoise, Marquet & Co., Paris, France, a French society Original No. 3,198,229, dated Aug. 3, 1965, Ser. No. 335,123, Jan. 2, 1964. Application for reissue Aug. 9, 1966, Ser. No. 573,158
4 Claims. (Cl. 151—21)

Matter enclosed in heavy brackets [ ] appears in the original patent but forms no part of this reissue specification; matter printed in italics indicates the additions made by reissue.

The present application is a continuation-in-part of copending application Serial No. 86,056, filed January 31, 1961 and now abandoned.

This invention relates to self-locking nuts of the deformable type in which, simultaneously with the self-locking action, the bearing end face of the nut is adapted for self-alignment into a plane parallel with the bearing surface against which the nut is screwed.

To achieve the simultaneous self-locking and self-aligning effects, nuts of the type to which the invention relates generally include an inner cylindrical part or bushing which is internally threaded to constitute the nut proper, and a coaxial outer skirt part which is connected with the inner part by an annular wall or web portion generally normal to the axis of the nut, and positioned at the end remote from the bearing end-face of the nut. This connecting web is deformable, and as the nut is tightened down against a bearing surface the bushing and skirt are subjected to a substantial relative displacement through deformation of the connecting web, and in so doing provide the desired self-locking and aligning actions.

In self-locking nuts of this type high local stresses are set up in the comparatively thin and flexible connecting web during the tightening step, and this has frequently resulted in the appearance of small cracks or internal tensions within said web which in turn have led to a rapid breakdown of the nut under the vibrational and shock conditions encountered in service. To overcome this difficulty, it has been proposed to provide a separate ring member or insert interposed in the annular space between the bushing and skirt portions of the nut at the end thereof adjacent to the bearing surface, and serving to transmit forces directly between the bushing and skirt while not preventing the requisite relative displacements therebetween. The ring insert has, in effect, served to transfer the deformation stresses arising during the tightening of the inner bushing of the nut against the bearing surface, to the surrounding skirt which is much stronger and better able to take up the resulting strains than is the deformable connecting web, and this expedient has been generally successful in prolonging the service life of the nut. However, the necessity of providing this annular insert which has to be separately machined to a special contour with rather close tolerances, has increased the cost of the self-locking nut devices and has made them more complicated and inconvenient to utilize.

It is an object of this invention to provide an improved construction of self-locking, self-aligning nut devices which will be completely free from the difficulties and drawbacks just described. Objects are to provide such nut devices which will be of integral one-piece construction so that they will be simple and inexpensive to make and handy to use, while yet being so designed that the high internal stresses generated during the nut-tightening step will be effectively distributed throughout the nut sructure rather than being localized in the connecting web, thereby insuring prolonged service life under strenuous vibrations and shocks.

Briefly, in accordance with the invention, a self-locking nut comprises an internally-threaded inner bushing portion constituting the nut proper, an outer skirt portion coaxially surrounding the bushing portion and connected thereto by way of a annular web at the end of the nut remote from the bearing end of the nut, [at least one of] said bushing and skirt portions being [so contoured that their outer and inner peripheries, respectively, are] in mutual engagement over a substantial axial length adjacent to said bearing end of the nut. The engagement between the bushing and skirt portions is such as to insure substantial transfer of stresses between said portions, while not interfering with the necessary relative sliding displacements therebetween.

In a preferred form of the invention, the mutual peripheral engagement between the bushing and skirt portions adjacent the bearing end of the nut is obtained by forming the bushing portion with an outwardly projecting or thickened contour adjacent said bearing end.

An exemplary embodiment of the invention will now be described for purposes of illustration but not of limitation with reference to the accompanying drawings, wherein.

Figure 2:
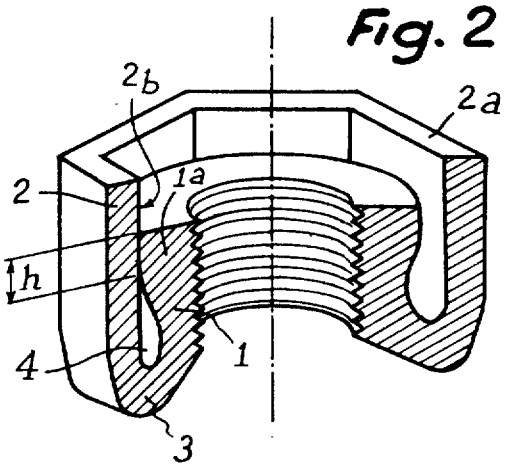
FIG. 2 is a cut-away perspective view thereof, the cut being made on the planes II—II of FIG. 1, and FIGS. 3 and 4 are axial sectional views of the nut device in operative position around a bolt, respectively before and after the nut has been screwed home against a bearing surface.
Figure 1:
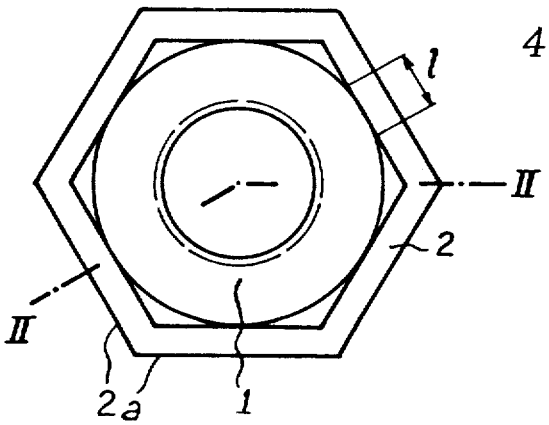
FIG. 1 is a plan view of an embodiment of the improved nut device.

As shown in FIGS. 1 and 2, an improved self-locking nut comprises an integral structure including an inner nut portion or bushing 1 which is internally threaded, and an outer or skirt portion 2 which coaxially surrounds the bushing. The bushing and skirt portions are integrally interconnected by a generally radial annular wall or web 3 at one end of the nut structure. The skirt portion 2 is shown contoured to provide the conventional hexagonal form; however any other desired contour e.g. cylindrical may be used. The end face 2a of the skirt 2 remote from the connecting web 3 constitutes a surface adapted to be tightened against a flat bearing surface as will presently be described.

In accordance with the invention, the bushing portion 1 has its outer periphery so contoured as to form an enlargement 1a which engages the inner periphery of the skirt over a substantial axial area extending from the free end of the bushing. As shown in FIGS. 1 and 2, the axial length of said area is indicated as h, while the transverse width of the area of contact engagement between the bushing periphery and each of the six flat sides of the hexagonal skirt is indicated as l. The respective values of the h and l dimensions may vary considerably depending on the precise shape of the nut and the particular production method used in its manufacture. Should the inner periphery 2b of the skirt portion be cylindrical rather than hexagonal as shown, the area of engagement between the bushing and skirt would extend continuously around the bushing, rather than being limited to only a portion l of each of the flat sides thereof as is the case in the illustrated example. [In any case] *As shown*, the axial extent h of the area of engagement [should be] *is* substantially less than the full free length of the bushing, [e.g. half said free length or less,] so as to leave an annular space 4 between the bushing and skirt portions adjacent the connecting wall 3.

Figure 3:
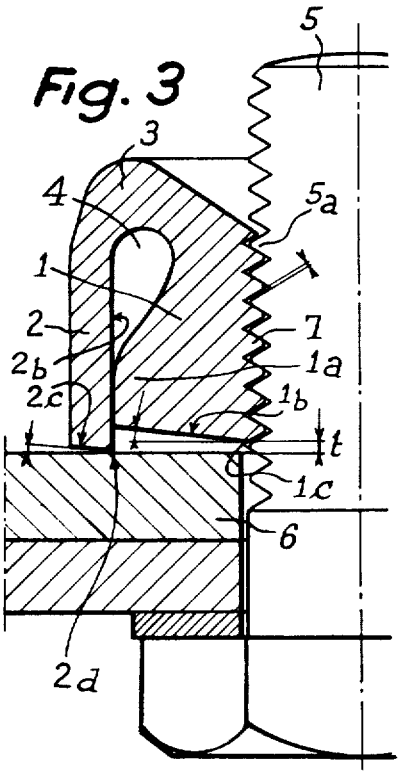

As shown, the skirt portion extends beyond the nut portion at the end remote from the connecting web, in the relaxed or free condition of the nut. In FIG. 3, the amount by which the skirt projects beyond the bushing is indicated as the length t. Also, in the relaxed or loose condition of the nut the bearing surfaces 1b and 2c of the bushing and skirt respectively do not lie flat and parallel to the bearing surface, but rather are somewhat conical, or tapered, such that said bushing and skirt will first engage the bearing surface, during the screwing operation, along circumferential ridge lines 1c and 2d respectively, which constitute the radially innermost lines of the end surfaces 1b and 2c of the bushing and skirt; this relationship is clearly apparent from FIG. 3.

In use, the nut is mounted on a bolt or screw rod 5 with the free ends of the bushing and skirt portions, i.e. the ends remote from connecting web 3, directed towards the bearing surface, here the surface of a flat frame member 6 against which the nut is to be screwed. FIG. 3 shows the nut in the position where the projecting inner circular rim 2d of the skirt portion is just touching the bearing surface; the nut is still substantially in its free or relaxed, undeformed, condition. As further torque is applied to rotate the nut beyond this position, the bushing portion 1 is forced downwards (as shown by arrow F, FIG. 4) relatively to the skirt 2 which is blocked against movement, such relative displacement being made possible by the deformability of the connecting web portion 3. Owing to the resistance opposed to the downward displacement of the threaded bushing portion 1 by the skirt 2 at this stage, the contact engagement between the threads 7 and 5a of the nut and bolt occurs along the upper surfaces of the nut threads, as is shown in somewhat exaggerated form in FIG. 3. Due mainly to the taper of the free edge surfaces 1b and 2c of the bushing and skirt, however, the threads 7 of the nut tend to penetrate deeper into the screw threads 5a of the bolt as securing proceeds, so that ultimately in the fully screwed condition of the assembly shown in FIG. 4 the contact engagement between the threads is substantiallly equal as between the two sides of each thread. Thus the desired self-locking (and self-aligning) actions are achieved.

In the ultimate stages of the screwing process, considerable stresses are generated in the nut material, due partly to the afore-mentioned penetration and radial clamping of the threads of the nut inwards into and around the threads of the bolt. In prior self-locking nuts in which the adjacent peripheral surfaces of the bushing 1 and the skirt 2 were radially spaced from each other at their free ends near the bearing surface, these stresses were mainly or exclusively transferred to the deformable web portion 3 and there tended to set up dangerously high strains resulting in premature breakage. However, in the construction here described the said stresses are effectively transferred between the bushing and skirt portions 1 and 2 by way of the interengaging areas at the base of said portions, whereby the strains are evenly distributed throughout the bushing and skirt portions rather than being localized chiefly at the relatively weak annular web at the top thereof. In this way the useful life of the nut is greatly extended. At the same time the said engagement does not interfere with the relative axial sliding displacement between the nut and skirt during screwing operations.

Figure 4:
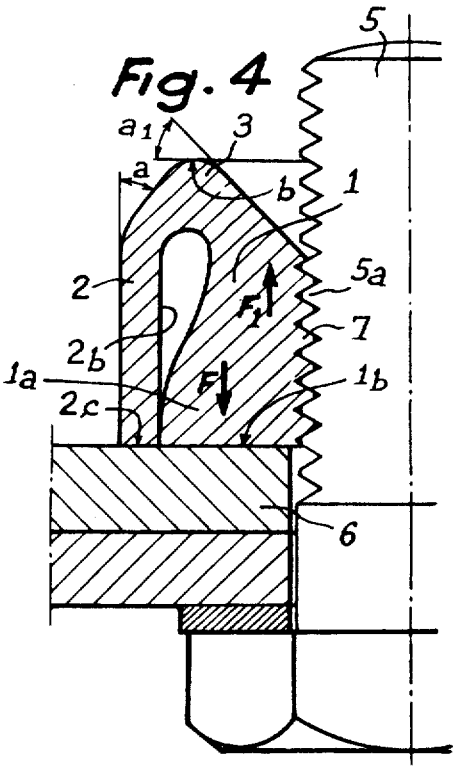

In case of an axial expansion or elongation of the bolt 5 with which the nut is used, the bushing 1 is displaced axially upwards relative to the skirt 2 as shown by arrow F1 in FIG. 4, so that said elongation is taken up by the deformation of the nut structure while retaining proper interlocking engagement between the threads. Also in this case any stresses generated by such deformations are transmitted to the skirt directly through the interengaging areas at the base of the nut, nor will they tend to set up dangerously concentrated strains in the web.

The improved self-locking nut of the invention is simple and inexpensive to manufacture, as from a press-formed or upset blank, since it does not require a separately machined annular insert as in the earlier type mentioned above, and for the same reason is more practical to use.

The precise shape of the upper portion of the nut defining the deformable web may be readily determined so as to impart the desired flexibility, and while the precise configuration may vary widely, as by varying the angles a and al and the radius b shown in FIG. 4, one satisfactory configuration is substantially that shown in the drawings.

Various other changes and modifications in shape and relative dimensioning may be made without departing from the scope of the invention. Thus, in the undeformed or relaxed condition of the nut, the bushing and skirt surfaces need not be in actual engagement but may be slightly spaced from each other, and the contact engagement between them may first occur only after some preliminary deformation has been imparted to the nut during the screwing process. Further, the positional and dimensional relationship between the free ends of the bushing and skirt, as well as the configurations of the free edge surfaces thereof, may differ from what has here been shown.

I claim:

1. A deformable self-locking nut comprising an internally threaded inner nut portion, an outer skirt portion surrounding said inner nut portion and generally coaxial therewith, said portions having an end adapted to engage a bearing surface and an end remote from the first said end, and a generally radial web portion integral with and interconnecting said inner and outer portions at the end remote from the first said end, said outer skirt portion extending axially beyond the inner nut portion at the first said end, said inner portion including an enlargement adjacent the first said end in contacting relation with the outer skirt portion, said radial web portion providing sufficient flexibility between the nut portion and skirt portion to permit relative movement therebetween, the outer skirt portion having an end surface which is adapted to engage said bearing surface, said end surface being tapered so that said end surface has an inner periphery which projects beyond the outer periphery of said end surface in the undeformed condition of the nut, the inner nut portion having an end surface which is adapted to engage said bearing surface, the latter said end surface being tapered so that said latter end surface has an inner periphery which projects beyond the outer periphery of said latter end surface in the undeformed condition of the nut.

2. A nut as claimed in claim 1 wherein said web is continuous.

3. A deformable self-locking nut comprising an inner nut portion having a threaded bore, an outer skirt portion surrounding said inner nut portion and generally coaxial therewith, said portions having free ends adapted to engage a bearing surface and a common end remote from said free ends, and a generally radial web portion integrally interconnecting and radially spacing apart said inner nut portion and said outer skirt portion at said common end, the free end of said outer skirt portion extending axially beyond the free end of said inner nut portion, said nut portion having a radially enlarged solid mass extending for a substantial distance from its free end toward said common end, the outer surface of said inner nut portion flaring from the region of said common end outwardly in the region of said enlarged solid mass to and into contact with the inner surface of said skirt portion at least at a purality of positions spaced around said nut portion and then extending along said inner surface of said skirt portion at each of said positions to provide an area of frictional engagement between said nut and skirt portions in the area of said free end of said nut portion, said radial web portion providing sufficient flexibility between the nut portion and skirt portion to permit relative movement therebetween.

4. *A deformable self-locking nut comprising an inner nut portion having a threaded bore and an outer skirt portion surrounding said inner nut portion and generally coaxial therewith, said portions having free ends adapted to engage a bearing surface and a common end at which*

*they are integrally joined, the free end of said outer skirt portion extending axially beyond the free end of said inner nut portion, the inner surface of said outer skirt portion and the outer surface of said inner nut portion being in contact at at least a plurality of points spaced around said inner nut portion to provide areas of frictional engagement extending from a position adjacent said free ends for at least a substantial axial distance toward said common end, the arrangement being such that there is sufficient flexibility between the nut portion and skirt portion to permit relative movement therebetween.*

References Cited

The following references cited by the Examiner, are of record in the patented file of this patent or the original patent.

UNITED STATES PATENTS

| | | | |
|---|---|---|---|
| 2,154,174 | 4/1939 | Marchou | 151—21 |
| 2,287,691 | 6/1942 | Marchou | 127—21 |
| 2,551,102 | 5/1951 | Delaney | 151—21 |

CARL W. TOMLIN, *Primary Examiner.*

RAMON S. BRITTS, *Assistant Examiner.*